(12) United States Patent
Chiao

(10) Patent No.: US 7,533,890 B2
(45) Date of Patent: May 19, 2009

(54) DAMPING ADJUSTING/CONTROLLING SYSTEM FOR WIRELESS ADJUSTMENT OF SHOCK-ABSORBERS FOR VEHICLE

(76) Inventor: Shui-Chuan Chiao, No. 20, Sub-alley 11 Alley 2, Lane 15, Baofong St., Bade City, Taoyuan County 33460 (TW)

( * ) Notice: Subject to any disclaimer, the term of this patent is extended or adjusted under 35 U.S.C. 154(b) by 304 days.

(21) Appl. No.: 11/520,409

(22) Filed: Sep. 12, 2006

(65) Prior Publication Data

US 2007/0255466 A1   Nov. 1, 2007

(30) Foreign Application Priority Data

Apr. 28, 2006   (TW) ................................ 95207210 U

(51) Int. Cl.
*B60G 17/015* (2006.01)
*B60G 21/00* (2006.01)

(52) U.S. Cl. ............... 280/5.504; 280/5.507; 280/5.508; 280/5.515; 701/37

(58) Field of Classification Search ................. 280/5.5, 280/5.504, 5.507, 5.508, 5.512, 5.515, 124.101, 280/124.102; 701/37, 38, 40
See application file for complete search history.

(56) References Cited

U.S. PATENT DOCUMENTS

| | | | | |
|---|---|---|---|---|
| 4,693,493 A | * | 9/1987 | Ikemoto et al. | 280/5.51 |
| 4,728,120 A | * | 3/1988 | Buma et al. | 280/5.519 |
| 4,765,649 A | * | 8/1988 | Ikemoto et al. | 280/5.51 |
| 4,770,438 A | * | 9/1988 | Sugasawa et al. | 280/5.518 |
| 4,977,506 A | * | 12/1990 | Hara et al. | 701/37 |
| 5,248,015 A | * | 9/1993 | Yoshioka et al. | 188/266.3 |
| 5,295,705 A | * | 3/1994 | Butsuen et al. | 188/266.4 |
| 5,767,642 A | * | 6/1998 | Furukawa | 318/286 |
| 6,073,736 A | * | 6/2000 | Franklin | 188/322.15 |
| 6,543,589 B2 | * | 4/2003 | Anderson | 188/267.2 |
| 2002/0079176 A1 | * | 6/2002 | Anderson | 188/290 |
| 2002/0180166 A1 | * | 12/2002 | Voss | 280/5.5 |
| 2005/0192727 A1 | * | 9/2005 | Shostak et al. | 701/37 |

* cited by examiner

*Primary Examiner*—Faye M. Fleming
*Assistant Examiner*—Laura Freedman
(74) *Attorney, Agent, or Firm*—Alan Kamrath; Kamrath & Associates PA

(57) ABSTRACT

A damping adjusting/controlling system is provided for a vehicle having two front shock-absorbers and two rear shock-absorbers. Each shock-absorber includes a piston rod having a central rod mounted therein. The damping adjusting/controlling system includes two front motors and two rear motors for driving the central rods of the front and rear shock-absorbers, respectively. Front and rear motor controller are mounted to front and rear portions of the vehicle and electrically connected to the front and rear motors, respectively. A main controller is operable to proceed with bidirectional information transmission/reception between a programmed chip of the main controller and programmed chips of the front and rear motor controllers to drive at least one of the front and rear motors, thereby adjusting a height of the central rod and a damping state of at least one of the front and rear shock-absorbers.

5 Claims, 10 Drawing Sheets

US 7,533,890 B2

DAMPING ADJUSTING/CONTROLLING SYSTEM FOR WIRELESS ADJUSTMENT OF SHOCK-ABSORBERS FOR VEHICLE

BACKGROUND OF THE INVENTION

1. Field of the Invention

The present invention relates to a damping adjusting/controlling system and, more particularly, to a damping adjusting/controlling system for shock-absorbers for a vehicle.

2. Description of the Related Art

A shock-absorber for a vehicle generally includes a spring and a damping cylinder to provide a damping effect for the purposes of reducing the springing motion of the spring or to assist the spring in enhancing driving comfort.

There are two types of currently available shock-absorbers, one with adjustable damping, and the other with fixed damping. Shock-absorbers with adjustable damping are mainly used with expensive vehicles, and the damping is adjusted via electric control.

FIG. 1 of the drawings illustrates a conventional damping adjusting/controlling system for vehicular shock-absorbers. Four shock-absorbers 111, 112, 113, and 114 are mounted to front and rear ends of a vehicle 10. For each shock-absorber 111, 112, 113, 114, a motor 121, 122, 123, 124 is provided for moving the shock-absorber 111, 112, 113, 114 and a central rod in a piston rod in each shock-absorber 111, 112, 113, 114 to thereby adjust the damping of the shock-absorber 111, 112, 113, 114.

A main controller 13 and a motor controller 14 must be mounted in the interior of the vehicle 10 and electrically connected to each other via wiring 15. The motors 121-124 are electrically connected to the motor controller 14 via respective wirings 161, 162, 163, and 164. However, installation of the wiring 15 for the main controller 13 is troublesome and inconvenient while unable to provide reliable operation. Further, the motor controller 14 is relatively large and, thus, cannot be installed in a hidden manner. Further, the wirings 163 and 164 are relatively long and, thus, require disassembly of the interior equipment of the vehicle, which is difficult, labor-intensive, time-consuming, and costly.

SUMMARY OF THE INVENTION

A damping adjusting/controlling system in accordance with the present invention is provided for a vehicle including two front shock-absorbers and two rear shock-absorbers. Each of the front and rear shock-absorbers includes a piston rod having a central rod mounted therein.

The damping adjusting/controlling system comprises:

two front motors and two rear motors for driving the central rods of the front and rear shock-absorbers, respectively;

a front motor controller mounted to a front portion of the vehicle and electrically connected to the front motors, the front motor controller including a radio wave communication interface, a programmed chip, and a memory;

a rear motor controller mounted to a rear portion of the vehicle and electrically connected to the rear motors, the rear motor controller including a radio wave communication interface, a programmed chip, and a memory;

a main controller including a radio wave communication interface, a programmed chip, and a memory, the main controller further including a keypad input device and four liquid crystal displays connected to the programmed chip of the main controller;

wherein the main controller is operable to proceed with bidirectional information transmission/reception between the programmed chip of the main controller and the programmed chips of the front and rear motor controllers to drive at least one of the front and rear motors, thereby adjusting a height of the central rod and a damping state of at least one of the front and rear shock-absorbers.

Preferably, the front and rear motors are step motors.

Preferably, the main controller controls the front and rear motor controllers.

Preferably, the main controller is operable to set a plurality of sets of data corresponding to different combinations of positions of the front and rear motors through operation of the programmed chip of the main controller. The sets of data are stored in the memory of the main controller.

In an example, each of the front and rear motors has an output shaft, and the piston rod of an associated one of the front and rear shock-absorbers includes a central hole into which the central rod is extended. The central hole includes a threaded section in an upper end thereof.

A hollow coupling seat is mounted between each of the front and rear motors and an associated one of the front and rear shock-absorbers. The hollow coupling seat includes a first seat to which an associated one of the front and rear motors is fixedly mounted. The coupling seat further includes a second seat threadedly engaged with the first seat to allow adjustment of a height of the associated one of the front and rear motors.

A threaded member is mounted in the threaded section in the piston rod. The threaded member includes a first end abutting against the central rod and a second end having a polygonal groove. A threaded seat is mounted in the threaded section in the piston rod and includes a portion outside the piston rod.

A connecting rod extends through a hole of the threaded seat and includes a polygonal head and a polygonal shank. The polygonal shank of the connecting rod is engaged in the polygonal groove of the threaded member. A coupler is coupled to the output shaft. The coupler includes a socket for coupling with the polygonal head of the connecting rod. An associated one of the front and rear motors is drivable to drive the connecting rod to turn on site while turning and moving the threaded member in a longitudinal direction, thereby adjusting the height of the central rod and the damping state of an associated one of the shock-absorbers.

Other objectives, advantages, and features of the invention will become more apparent from the following detailed description when taken in conjunction with the accompanying drawings.

DETAILED DESCRIPTION OF THE PREFERRED EMBODIMENT

Figure 1:
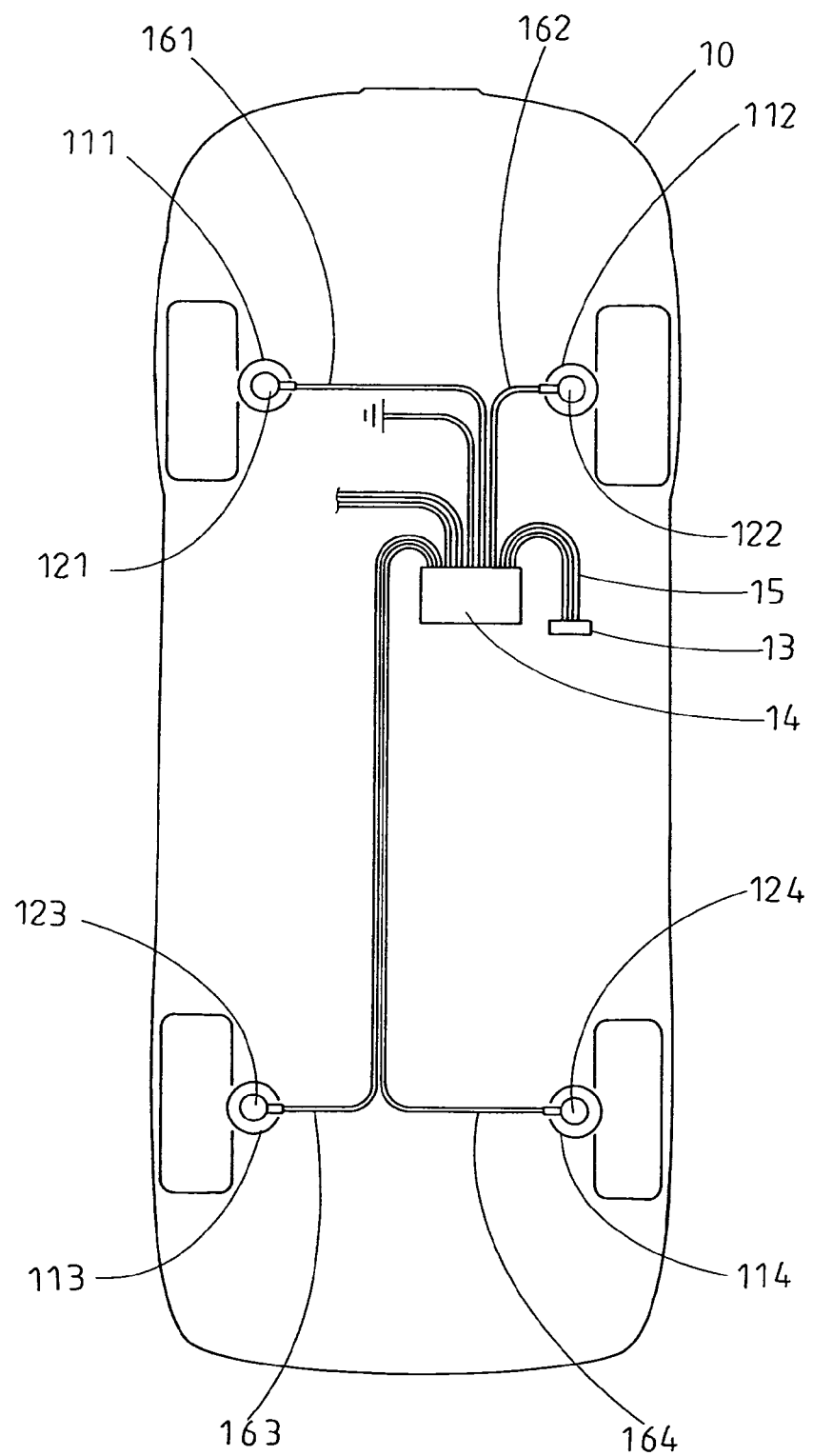
FIG. 1 is a schematic view of a conventional damping adjusting/controlling system for shock-absorbers of a vehicle.
Figure 2:
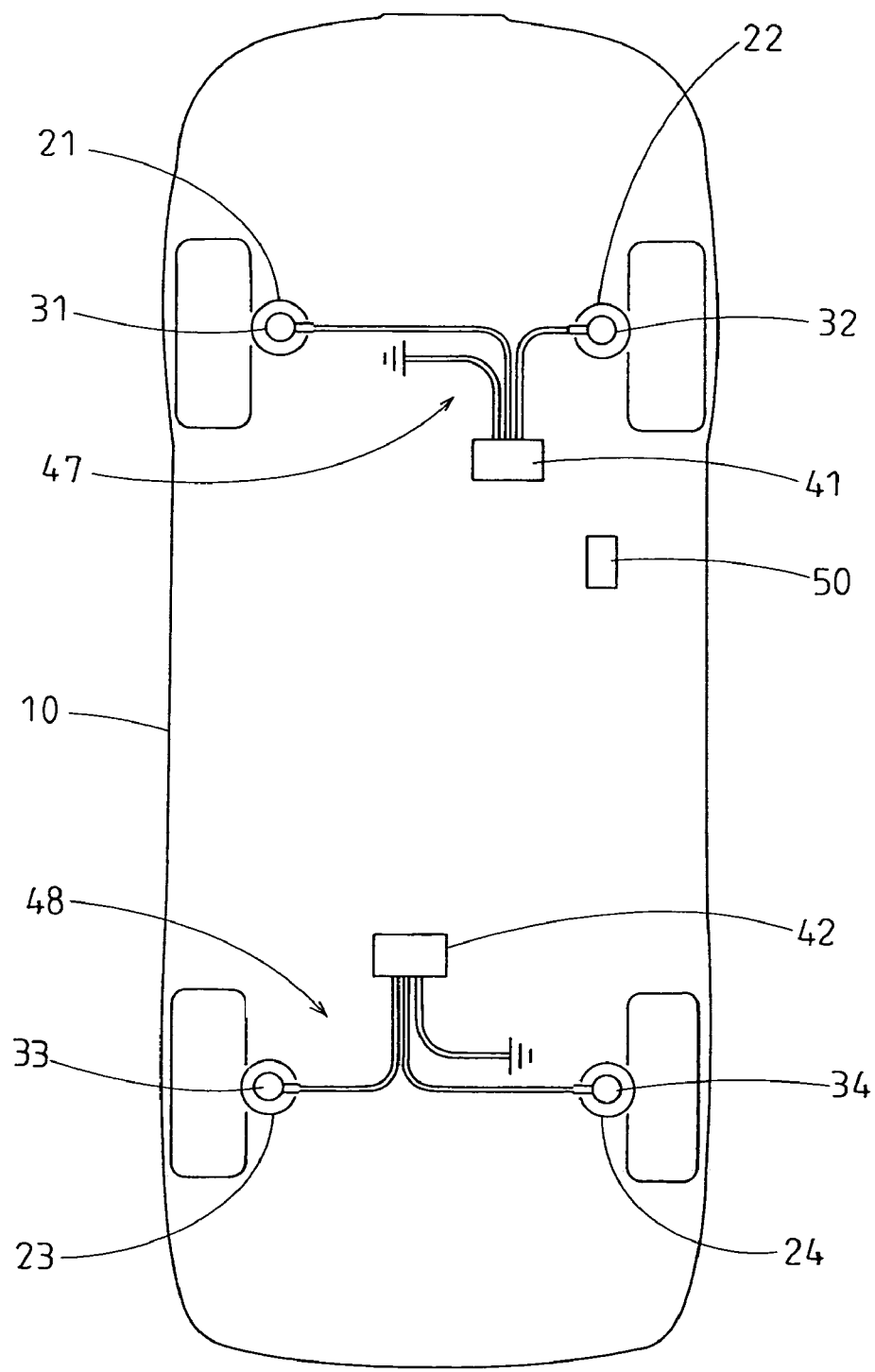
FIG. 2 is a schematic view of a damping adjusting/controlling system for wireless adjustment of shock-absorbers of a vehicle in accordance with the present invention.
Figure 3:
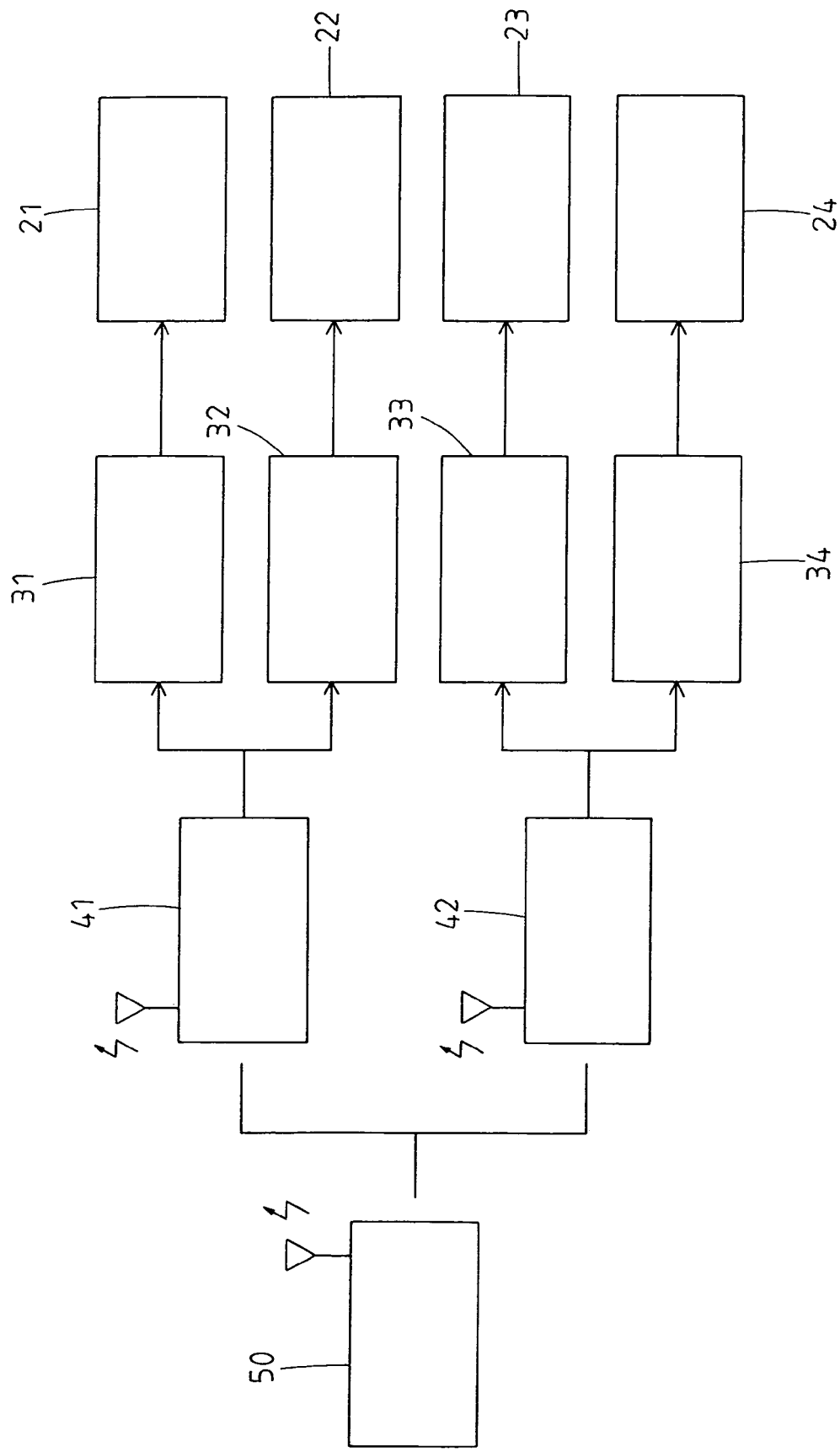
FIG. 3 is a schematic block diagram of the damping adjusting/controlling system in FIG. 2.
Figure 4:
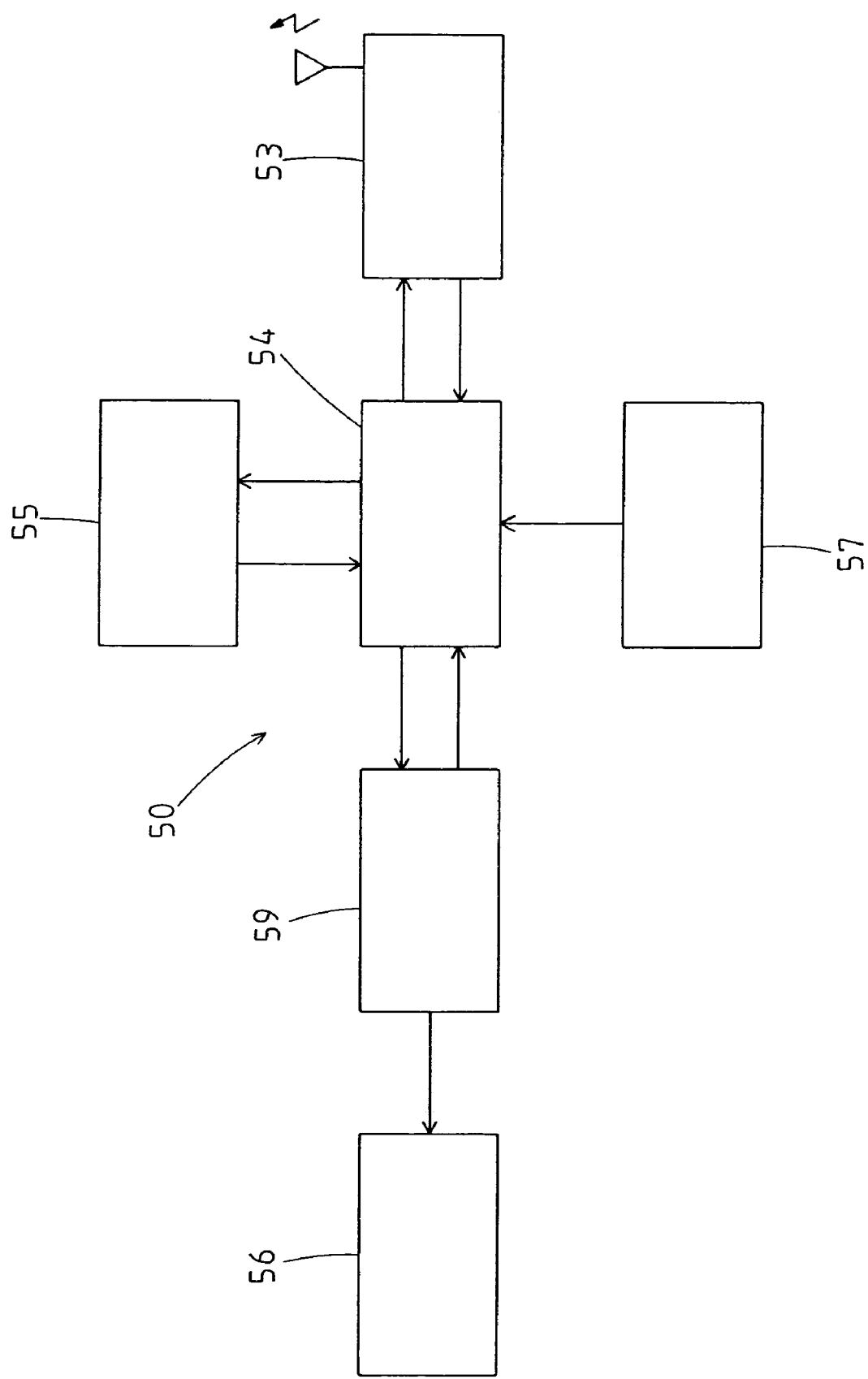
FIG. 4 is a schematic block diagram illustrating a main controller of the damping adjusting/controlling system in FIG. 3.

Referring to FIGS. 2 and 3, a damping adjusting/controlling system in accordance with the present invention is provided for wireless adjustment of shock-absorbers 21, 22, 23, and 24 of a vehicle 10. The damping adjusting/controlling system comprises four motors 31, 32, 33, and 34, front and rear motor controllers 41 and 42, and a main controller 50. Bidirectional wireless communication is conducted between the main controllers 50 and the motor controllers 41-42 to respectively drive the respective motors 31-34 for adjusting/controlling the damping states of the respective shock-absorbers 21-24.

Figure 8:
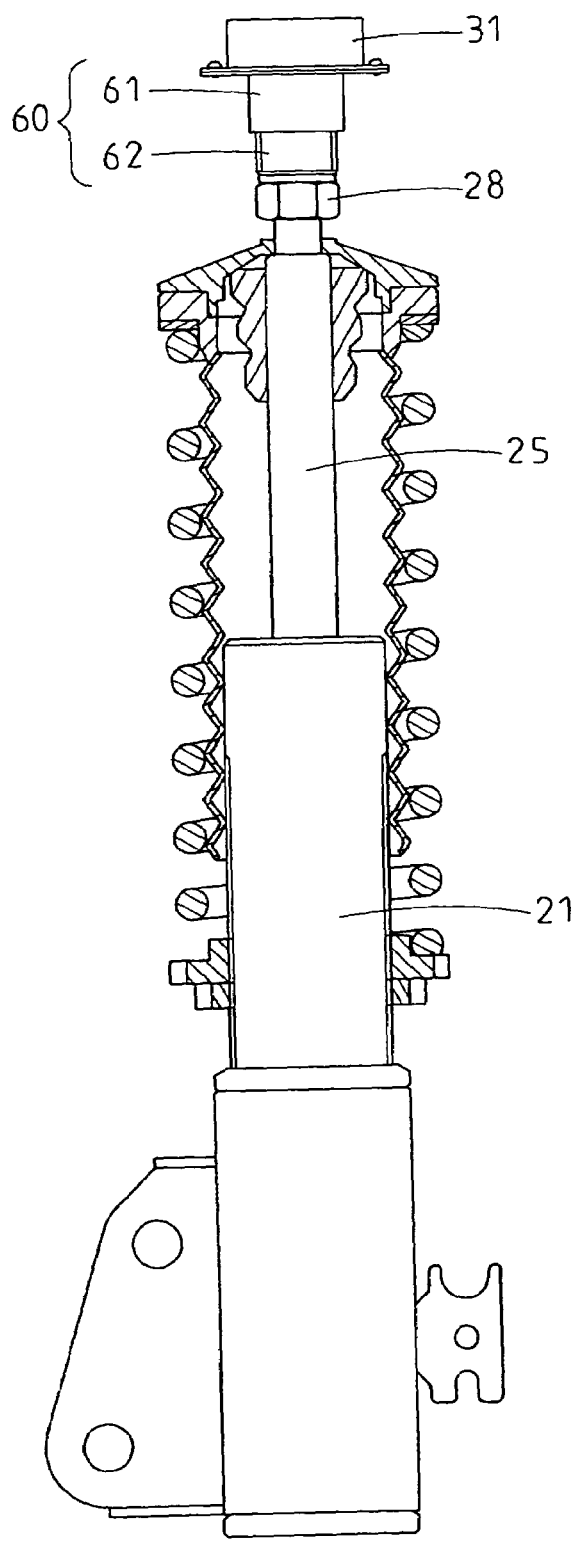
FIG. 8 is a partly-sectioned side view of a shock-absorber and an associated motor.
Figure 9:
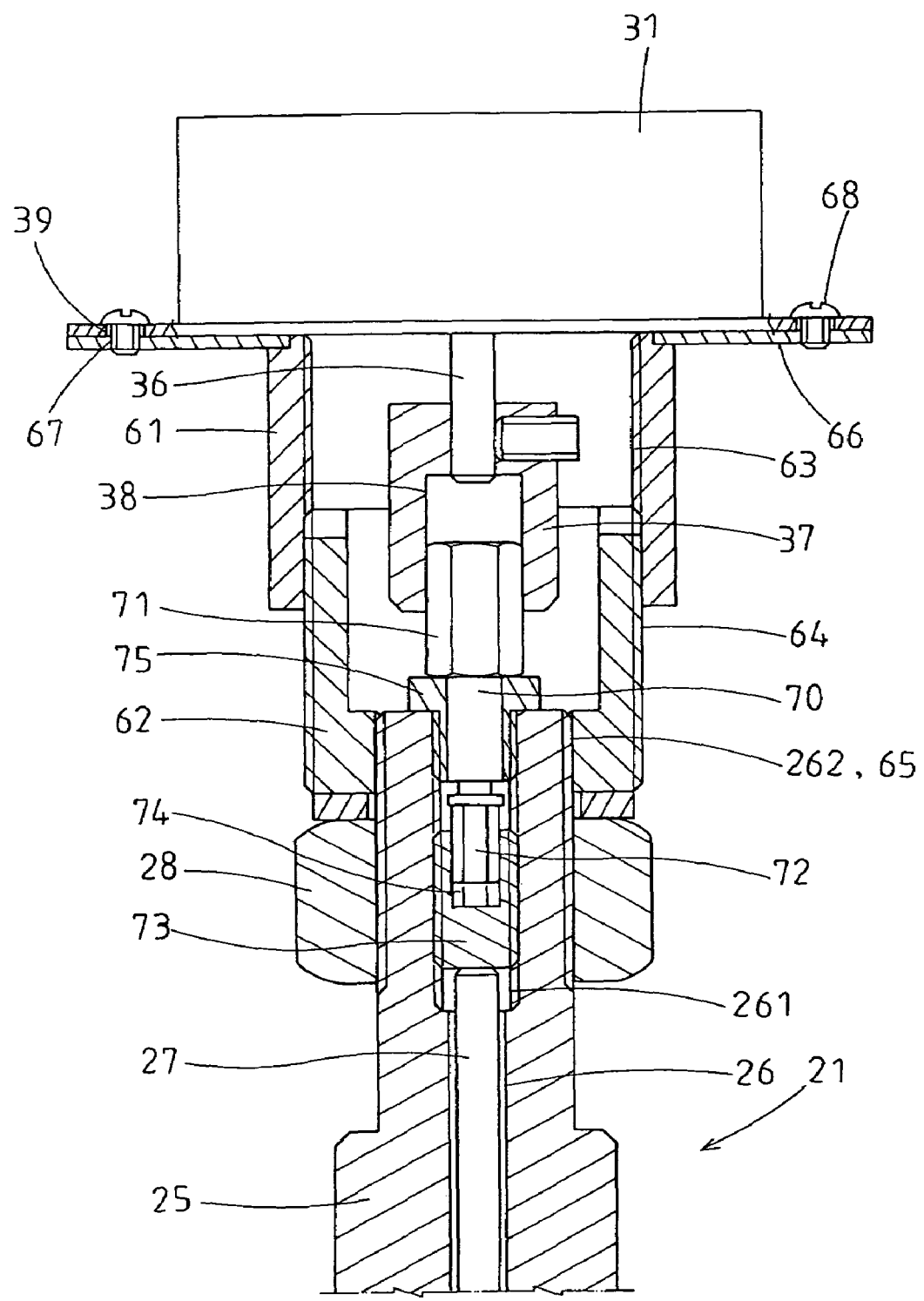
FIG. 9 is an enlarged sectional view of a portion of the shock-absorber and the associated motor in FIG. 8.

Referring to FIGS. 2, 8, and 9, each shock-absorber (e.g., shock-absorber 21) includes a piston rod 25. In this example, the motor 31 is preferably a step motor and includes a shaft 36 for driving a central rod 27 in the piston rod 25 for the purposes of adjusting the height and the damping state of the central rod 27.

Figure 6:
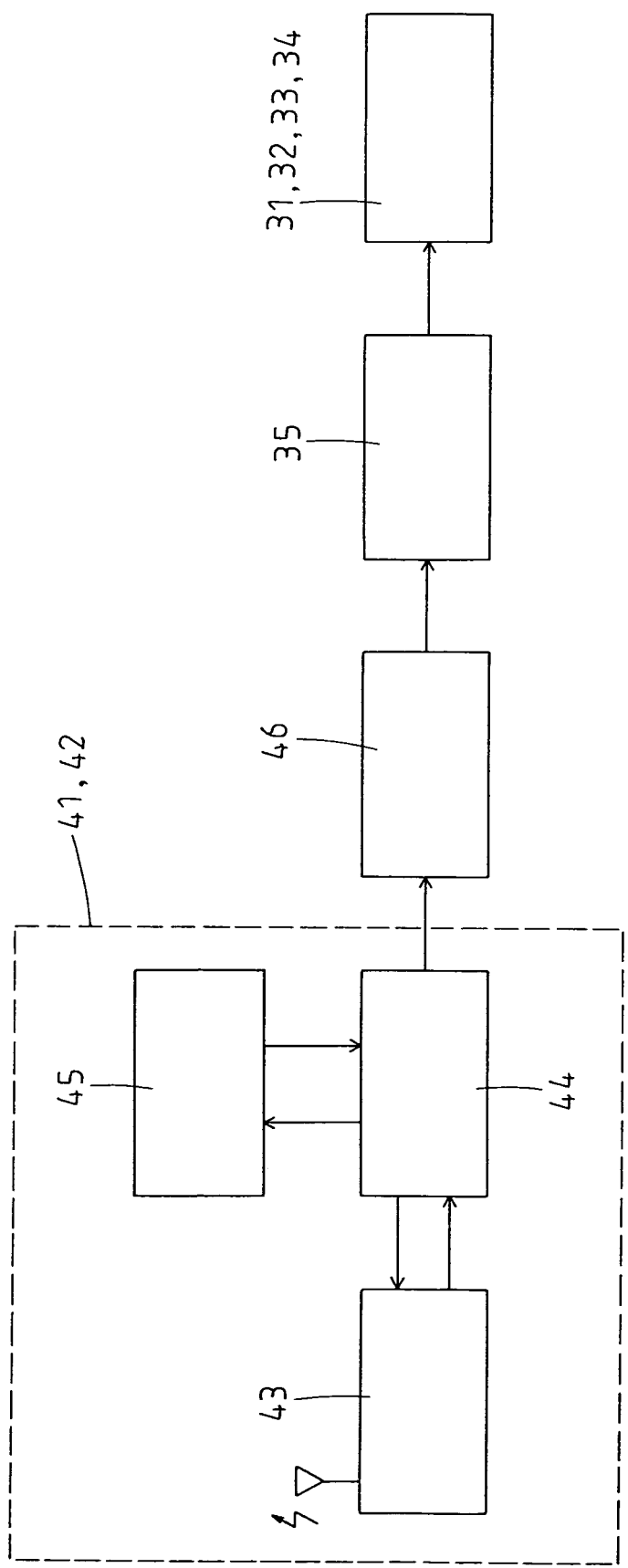
FIG. 6 is a schematic diagram illustrating a motor controller of the damping adjusting/controlling system in FIG. 3.

The front and rear motor controllers 41 and 42 are respectively mounted to front and rear portions of the vehicle 10. Referring to FIGS. 2, 3, and 6, each motor controller 41, 42 includes a radio wave communication interface 43, a programmed chip 44, and a memory 45. The motor controller 41 is connected to the motors 31 and 32 associated with the shock-absorbers 21 and 22 whereas the motor controller 42 is connected to the motors 33 and 34 associated with the shock-absorbers 23 and 24.

Referring to FIGS. 2 through 5, the main controller 50 includes a radio wave communication interface 53, a programmed chip 54, a memory 55, and a driving chip set 59 for the memory 55. A keypad input device 57 and four liquid crystal displays 56 are connected to the programmed chip 54. The heights and damping states of the central rods 27 of the respective shock-absorbers 21-24 are adjusted through bidirectional information transmitting/receiving operation between the programmed chips 44 and 54 of the main controllers 40 and the motor controllers 41-42. Damping of the two front shock-absorbers 21 and 22 or the two rear shock-absorbers 23 and 24 can be carried out at the same time. Alternatively, each shock-absorber 21-24 can be adjusted independently.

In a preferred embodiment, the chips 44 and 54 of the main controller 50 and the motor controllers 41-42 are MCU (microcontroller unit) programmed chips using an 8-bit operating core. The programs loaded according to different modules include different control sequences. Common programs of the programmed chips 44 and 54 include coding, decoding, and memory management of RF (radio-frequency) wireless communication transmission/reception. Further, a plurality of sets of controlling data corresponding to different positions of various sets of combinations of the motors 31-34 can be set, and the controlling data and related parameters are stored in the memories 45 and 55 (such as EEPRAM) such that the data will not be lost when out of electricity. The frequency used for communication between the RF radio wave communication interface 43 and 53 is 433-915 MHz and 2-4 GHz for bidirectional transmitting/receiving operation.

Referring to FIG. 6, each motor 31, 32, 33, 34 includes a driving circuit chip 35. In a case that step motors are used and driven with a 12V battery of the vehicle and that the controlling power source has a voltage of 3-5V, an isolating indirect driving device 46 must be mounted between the programmed chip 44 and the driving circuit chip 35 for protection purposes.

Figure 5:
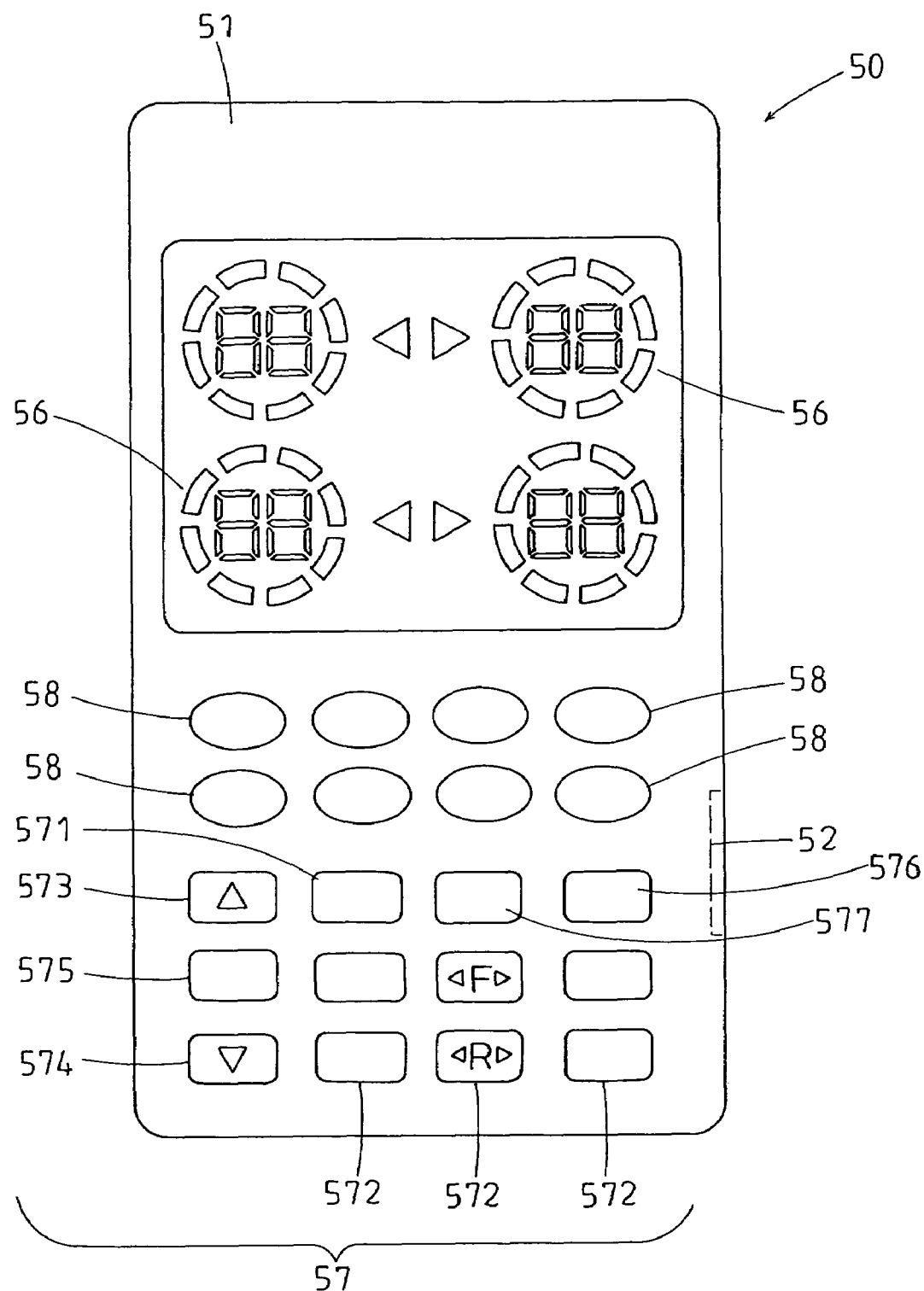
FIG. 5 is a top view of the main controller in FIG. 4.

Referring to FIG. 5, the main controller 50 includes a panel 51 and a power switch 52. The keypad input device 57 includes eight data-memory keys 58 (respectively corresponding to eight sets of data), a setting key 571, six motor driving keys 572 for driving one or more of the motors 31-34, motor-position changing keys 573 and 574, an execution key 575, a storage key 576, and an exit key 577.

Figure 7:
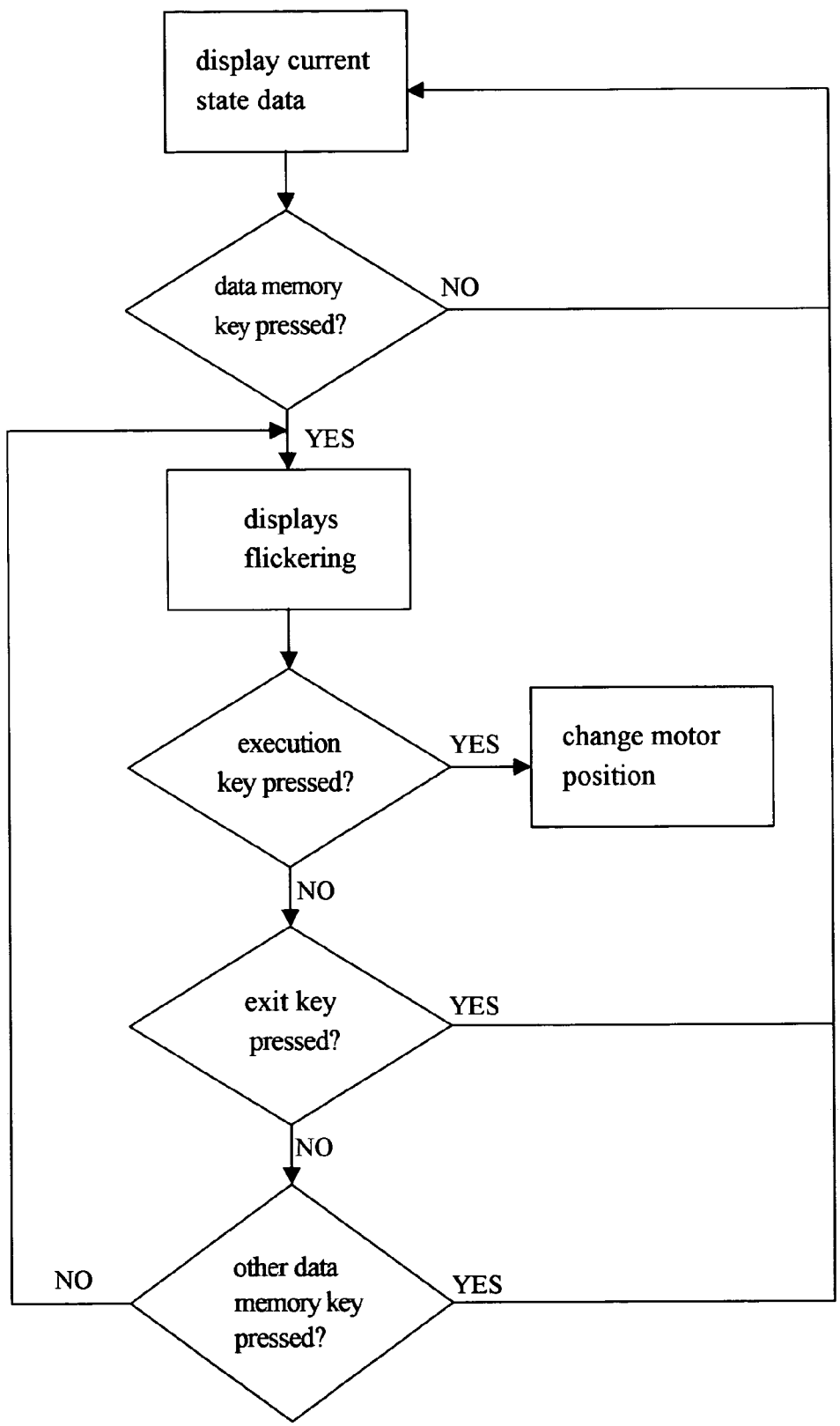
FIG. 7 is a flowchart illustrating operation of the damping adjusting/controlling system in accordance with the present invention.

The main controller 50 is capable of calling the motor controllers 41 and 42 to send back signals regarding the positions of the motors 31-34, which can be displayed on the liquid crystal displays 56 (see FIGS. 5 and 7). If one of the data-memory keys 58 is pressed, the four liquid crystal displays 56 flicker and show the selected set of data. In this case, if the execution key 575 is pressed, the associated set of data is processed to move associated motor(s) 21-24 to the required positions. If the execution key 575 is not pressed and the exit key 577 is pressed, the liquid crystal displays 56 flicker and show the current set of data. If none of the execution key 575, the exit key 577, and other data-memory keys 58 are pressed within 10 seconds, the liquid crystal displays 56 show data corresponding to the current positions of the motors 31-34. Nevertheless, if another data-memory key 58 is pressed, the liquid crystal displays 56 flicker and show the newly selected set of data.

When adjustment of one or more of the damping states of the shock-absorbers 21-24 is desired, the setting key 571 is pressed, and then one of the motor driving keys 572 is pressed to select the associated motor(s) 31-34 that will be adjusted in their positions. Next, the motor-position changing keys 573, 574 are pressed to change the data regarding the positions of the associated motor(s) 31-34. The execution key 575 is then pressed to carry out processing for moving the motor(s) 31-34 to the desired positions.

Figure 10:
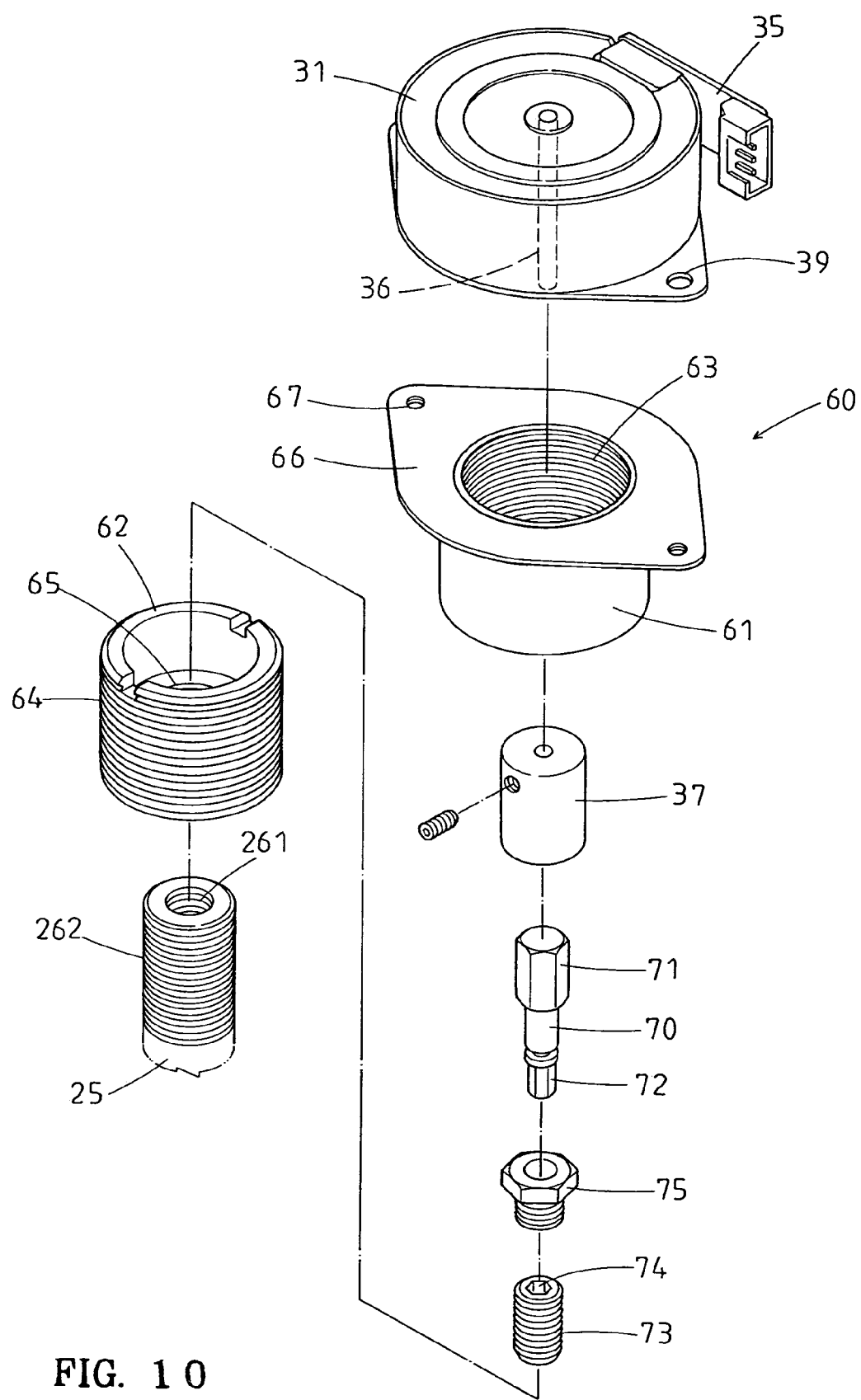
FIG. 10 is an exploded perspective view of the shock-absorber and the associated motor in FIG. 9.

Referring to FIG. 2, a motor 31, 32, 33, 34 is provided for an associated shock-absorber 21, 22, 23, 24. FIGS. 8 through 10, taking the shock-absorber 21 and the motor 31 as an example, a hollow coupling seat 60 is mounted between the motor 31 and the shock-absorber 21. The coupling seat 60 includes a first seat 61 and a second seat 62 threadedly engaged with the first seat 61 through inner and outer threading 63 and 64, allowing adjustment of the position of the motor 31. The first seat 61 includes a plate 66 with fixing holes 67. Screws or bolts 68 are extended through the fixing holes 67 of the plate 66 and fixing holes 39 in a mounting member (not labeled) of the motor 31. The second seat 62 includes a screw hole 65 threadedly engaged with outer threading 262 of the position rod 25, and a nut 28 is engaged with the outer threading 262 of the piston rod 25 for positioning purposes.

The piston rod 25 includes a central hole 26 into which the central rod 27 is extended. The central hole 26 includes a threaded section 261 in an upper end thereof. A threaded member 73 is mounted in the threaded section 261 in the piston rod 25 and has an end abutting against an end of the central rod 27. The other end of the threaded member 73 includes a polygonal groove 74. A threaded seat 75 is mounted in the threaded section hole 261 in the piston rod 25 and includes a portion outside the piston rod 25. A connecting rod 70 is extended through a hole (not labeled) in the threaded seat 75 and includes a polygonal head 71 and a polygonal shank 72. The polygonal shank 72 of the connecting rod 70 is engaged in the polygonal groove 74 of the threaded member 73.

A coupler 37 is coupled to an end of the output shaft 36 of the motor 31. The coupler 37 includes a socket 38 for coupling with the polygonal head 71 of the connecting rod 73 for driving the connecting rod 70 to turn on site while turning and moving the threaded member 73 in a longitudinal direction. Hence, the height of the central rod 27 (i.e., the position of the top end of the central rod 27 in FIG. 9) and its related damping state is adjusted. Further, the threaded seat 75 is capable of adjusting the height of the connecting rod 70 and of setting the upward travel of the threaded member 73. The socket 38 of the coupler 37 has a sufficient depth allowing reliable coupling.

By providing a main controller 50 and two motor controllers 41-42 that carry out bidirectional transmission and reception of wireless communication information to drive the associated motor(s) 31-34 to execute position adjustment according to various sets of pre-stored position data, rapid and precise adjustment/control of the damping states of the shock-absorbers 21-24 can be achieved. The wireless operation of the main controller 50 and the small volumes of the motor controllers 41-42 allow easy installation and elimination of lengthy, troublesome wiring. The assembling procedures are simplified, and labor, time and costs are saved.

Although a specific embodiment has been illustrated and described, numerous modifications and variations are still possible. The scope of the invention is limited by the accompanying claims.

What is claimed is:

1. A damping adjusting/controlling system for a vehicle (10) including two front shock-absorbers (21 and 22) and two rear shock-absorbers (23 and 24), each of the front and rear shock-absorbers including a piston rod (25) having a central rod (27) mounted therein, the damping adjusting/controlling system comprising:
    two front motors (31 and 32) and two rear motors (33 and 34) for driving the central rods (27) of the front and rear shock-absorbers (21-24), respectively;
    a front motor controller (41) mounted to a front portion of the vehicle and electrically connected to the front motors, the front motor controller including a radio wave communication interface (43), a programmed chip (44), and a memory (45);
    a rear motor controller (42) mounted to a rear portion of the vehicle and electrically connected to the rear motors, the rear motor controller including a radio wave communication interface (43), a programmed chip (44), and a memory (45); and
    a main controller (50) including a radio wave communication interface (53), a programmed chip (54), and a memory (55), the main controller further including a keypad input device (57) and four liquid crystal displays (58) connected to the programmed chip (54) of the main controller;
    wherein the main controller (50) is operable to proceed with bidirectional information transmission/reception between the programmed chip (54) of the main controller and the programmed chips (44) of the front and rear motor controllers to drive at least one of the front and rear motors (31-34), thereby adjusting a height of the central rod (27) and a damping state of at least one of the front and rear shock-absorbers (21-24).

2. The damping adjusting/controlling system as claimed in claim 1 wherein the front and rear motors (21-24) are step motors.

3. The damping adjusting/controlling system as claimed in claim 1 wherein the main controller (50) controls the front and rear motor controllers (41 and 42).

4. The damping adjusting/controlling system as claimed in claim 1 wherein the main controller (50) is operable to set a plurality of sets of data corresponding to different combinations of positions of the front and rear motors (31-34) through operation of the programmed chip (54) of the main controller (50), said plurality of sets of data being stored in the memory (55) of the main controller.

5. The damping adjusting/controlling system as claimed in claim 1 wherein each of the front and rear motors (31-34) has an output shaft (36), and the piston rod (26) of an associated one of the front and rear shock-absorbers (21-24) includes a central hole (26) into which the central rod is extended, the central hole including a threaded section (261) in an upper end thereof, the damping adjusting/controlling system further comprising:
    a hollow coupling seat (60) mounted between each of the front and rear motors (31-34) and an associated one of the front and rear shock-absorbers (21-24), the hollow coupling seat including a first seat (61) to which an associated one of the front and rear motors is fixedly mounted, the coupling seat further including a second seat (62) threadedly engaged with the first seat to allow adjustment of a height of the associated one of the front and rear motors;
    a threaded member (73) mounted in the threaded section (261) in the piston rod (25), the threaded member including a first end abutting against the central rod (27) and a second end having a polygonal groove (74);
    a threaded seat (75) mounted in the threaded section (261) in the piston rod (25) and including a portion outside the piston rod, the threaded seat including a hole;
    a connecting rod (70) extending through the hole of the threaded seat (75) and including a polygonal head (71) and a polygonal shank (72), the polygonal shank (72) of the connecting rod being engaged in the polygonal groove (74) of the threaded member (73); and
    a coupler (37) coupled to the output shaft (36), the coupler including a socket (38) for coupling with the polygonal head (71) of the connecting rod (70), the associated one of the front and rear motors being drivable to drive the connecting rod (70) to turn on site while turning and moving the threaded member in a longitudinal direction, thereby adjusting the height of the central rod (27) and the damping state of the associated one of the shock-absorbers (21-24).

* * * * *